W. J. CROWELL, Jr.
CALORIMETRIC METHOD OF AND APPARATUS FOR MEASURING STEAM FLOW.
APPLICATION FILED SEPT. 24, 1918.
1,314,249.  Patented Aug. 26, 1919.
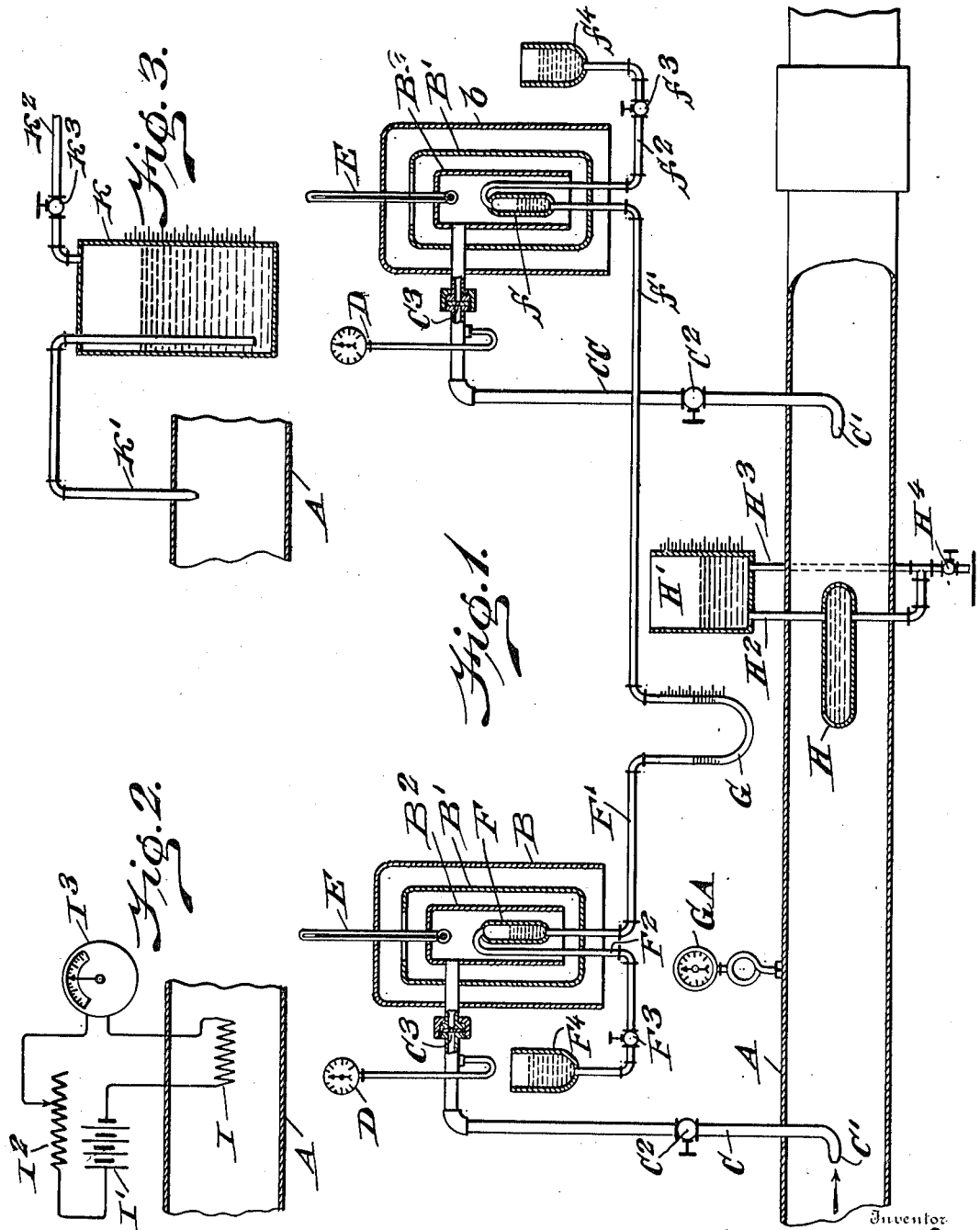

UNITED STATES PATENT OFFICE.

WILLIAM J. CROWELL, JR., OF WYNCOTE, PENNSYLVANIA.

CALORIMETRIC METHOD OF AND APPARATUS FOR MEASURING STEAM-FLOW.

1,314,249.   Specification of Letters Patent.   Patented Aug. 26, 1919.

Application filed September 24, 1918. Serial No. 255,450.

*To all whom it may concern:*

Be it known that I, WILLIAM J. CROWELL, Jr., a citizen of the United States, and a resident of Wyncote, county of Montgomery, State of Pennsylvania, have invented certain new and useful Improvements in Calorimetric Methods of and Apparatus for Measuring Steam-Flow, of which the following is a true and exact description, reference being had to the accompanying drawings.

The general object of my present invention is to provide a simple and effective method of, and apparatus for measuring the quantity of steam flow through a conduit by determining the change produced in the quality of the steam by the addition to, or the abstraction from the steam, of a measured amount of heat units, or by the addition to the steam of a measured amount of gas.

The various features of novelty which characterize my invention are pointed out with particularity in the claims annexed to and forming a part of this specification. For a better understanding of the invention, however, and its advantages, reference should be had to the accompanying drawings and descriptive matter in which I have illustrated and described preferred forms of apparatus and a preferred method of carrying out my invention.

Of the drawings:

Figure 1 is a diagrammatic representation, with parts broken away and in section, of a preferred form of apparatus for carrying out my invention.

Fig. 2 is a diagrammatic representation of a modified portion of the apparatus shown in Fig. 1, and Fig. 3 is a view taken similarly to Fig. 2 illustrating a second modification.

The apparatus shown in Fig. 1 comprises a conduit A through which the steam to be measured flows. B represents a throttling calorimeter for determining the quality of the steam flowing through the conduit at one point in the latter. The calorimeter B comprises, in the preferred form shown, an outer shell in the form of an inverted cup, a cup shaped member $B'$, smaller in diameter and shorter than the outer shell, and centrally located in the latter, and a third shell $B^2$ in the form of an inverted cup shorter and smaller in diameter than the cup $B'$, and centrally located therein. C represents a steam pipe having an inlet end $C'$, projecting into the conduit A and shaped generally like a Pitot tube, and preferably facing the direction of flow of the steam. The outer end of the pipe C is connected to the inner member $B^2$ of the calorimeter B. Closely adjacent to the calorimeter, the pipe C is formed with a throttling orifice $C^3$ substantially smaller in diameter than the bore of the pipe C. Between the conduit A and the throttling orifice $C^3$ a regulating valve $C^2$ is put in the pipe C. A pressure gage D is connected to the pipe C between the thottling orifice $C^3$ and the valve $C^2$. E represents a thermometer inserted into the calorimeter and having its bulb in the inner shell $B^2$ of the latter. A second calorimeter $b$, which may be identical with the calorimeter B, is connected by means of a pipe CC to the conduit at some distance from the point at which the pipe C is connected to the conduit. The pipe CC is provided with an inlet orifice $C'$, a valve $C^2$, a throttling orifice $C^3$, and has a gage D connected to it, as does the pipe C.

Located in the shell $B^2$ of the calorimeter B is a closed steam and water container F, connected at its lower end by a pipe $F'$, to a differential pressure gage G, which, as shown, is of the stationary U tube type containing a suitable sealing liquid as mercury. The upper end of the receptacle F is connected by a pipe $F^2$, containing a cutoff valve $F^3$, to the lower end of the receptacle $F^4$, open to the atmosphere at its upper end. A vessel $f$, similar to the receptacle F, is located in the member $B^2$ of the calorimeter $b$. The bottom of the vessel $f$ is connected to the second leg of the U gage G by a pipe $f'$, and the top of the receptacle $f$ is connected to a vessel $f^4$, open at its upper end, by a pipe $f^2$, including a cutoff valve $f^3$. A pressure gage GA is connected to the conduit A adjacent the points of connection to the latter of calorimeter pipes C and CC.

Located in the conduit A, between the two calorimeter pipe inlets $C'$ is a means for supplying heat to or abstracting heat from the steam flowing through the conduit at a measurable rate. As shown in Fig. 1 the means employed for this purpose comprises a liquid container H located within the conduit and having its top connected by a short pipe $H^2$ to the bottom of a liquid containing receptacle $H'$ located externally of the conduit A and having its upper end open to the atmosphere. The bottom of the vessel H is connected to the bottom of the receptacle H' by a pipe connection H³ longer than the pipe connection H². With this arrangement when the liquid in the receptacle H is heated by the passage of steam through the conduit A, steam will be generated in the receptacle and a circulation will be set up between the vessels H and H', steam and water passing from the vessel H to the vessel H' through the pipe H², and water returning to the vessel H through the pipe H³. H⁴ represents a cock for emptying the receptacles H and H', and for regulating the initial height of water level in the receptacle H. With this apparatus the heat abstracted from the steam flowing through the conduit A in a given period can be accurately determined by measuring the corresponding change of water level in the vessel H' which falls at a rate corresponding to the rate of evaporation. The pipes H² and H³ and vessel H' should be jacketed to reduce heat radiation losses.

In lieu of the vessels H and H', and the piping connecting them, other and very different means may be employed to supply measured quantities of heat to, or to abstract it from the steam passing through the conduit A between the connections to the latter of the calorimeter pipes C and CC. Two alternative forms of apparatus for this purpose are illustrated in Figs. 2 and 3. In Fig. 2, I represents an electrical resistance coil located in the conduit A and connected in series with a source of current I', a rheostat I², and a watt meter I³. This permits of a very accurate regulation and measurement of the rate at which heat is supplied to the conduit. In Fig. 3 water is sprayed into the conduit A at a rate which can be readily measured from the corresponding change in water level in the receptacle K supplying the pipe K', and which can be easily regulated by adjusting the valve K³. The latter controls the rate at which compressed air is supplied to the upper end of the receptacle K through a conduit K², and correspondingly controls the rate at which water is sprayed into the conduit A through the pipe K'. Another convenient mode of producing a measured steam quality changing effect is by discharging compressed air into the steam pipe as through the pipe K' of Fig. 3 at a measured rate.

In the use of the apparatus shown in Fig. 1 the valves F³ and f³ are closed, and the piping between these valves and the receptacles F and f, and the piping between those receptacles, are filled wholly with a suitable liquid, as water, and with vapor of that liquid, except for the mercury or other sealing liquid in the gage G. A vapor space is provided in the upper portions of the vessels F and f. A convenient method of getting the apparatus into the desired condition is to initially fill the entire conduit system between the valves F³ and f³, except for the sealing liquid occupied space in the gage G, with water and then heat the vessels F and f to vaporize a portion of this water to provide the desired vapor spaces in the tops of the vessels F and f. The valves F³ and f³ which are open during this preliminary boiling stage are then closed. This preliminary operation insures the elimination of air from the vessels F and f and connected piping.

With the fluids in the vessels F and f and the gage G in the desired condition, the valves C² in the calorimeter pipes C and CC are adjusted to get a steam flow through each of the latter at a rate insuring a supply of steam to the calorimeter B and b of the same quality as that flowing through the conduit A adjacent the Pitot ends C' of the respective calorimeter pipes C and CC. A steam sample of the proper quality can be withdrawn from the conduit A by the calorimeter pipes C and CC, shown, provided steam flows into the inlet end of each pipe C and CC at approximately the same velocity at which steam flows through the conduit A. A preliminary determination of the rate of steam flow through the conduit A, made as hereinafter described, forms a basis for determining with sufficient accuracy for the purpose, the pressures which the gages D should show to insure a proper steam flow into the calorimeters. After the rate of flow through the conduit A is thus preliminarily determined, the valves C² are adjusted to create pressures measured by the gages D in front of the restricted orifices C³ to insure a flow of steam of the desired velocities through those orifices and consequently into the inlet ends C' of the pipes C and CC.

With the apparatus put into condition for use as described, the rate at which steam flows through the conduit A can be determined with a high degree of accuracy from the change in the quality of the steam occurring in the flow of the steam between the points at which the calorimeter pipes C and CC are connected to the conduit by the addition or abstraction of heat at a measured rate to the steam flowing between these points. The quality of the steam withdrawn from the conduit through either of the calorimeter pipes can be determined with approximate accuracy from the readings of the steam gage G and of the corresponding calorimeter thermometer E, by recourse to ordinary steam tables in a manner well known to those skilled in the art. While it is thus possible, from the readings of the two thermometers E and the pressure gage G, to determine the change in the quality of the steam produced by the device H, or its described equivalents, with some approximation to accuracy, the difference in the readings of the two thermometers is in general so small that the instrumental and observational errors would introduce a relatively large factor of error into any determination of the flow rate based upon such a measure in the change of the quality of steam produced. By the use of a differential pressure gage connected to the vessels F and $f$ as described, however, the differential between the temperatures in the vessels $B^2$ of the calorimeters B and $b$ can be measured with a high degree of accuracy, for the pressure in each vessel F and $f$ will be a sensitive and accurate measure of the corresponding calorimeter temperature. An accurate measure of this pressure differential, coupled with the steam pressure gage reading and approximate temperature in one of the calorimeters given by the corresponding thermometer E and ordinary steam tables furnish a means for computing with a high degree of accuracy, the weight of steam flowing through the conduit A in a given time. Even though the valves $C^2$ are not properly adjusted, the error in determination resulting from such improper adjustment is comparatively small. In consequence a preliminary determination of the rate of steam flow through the conduit A, made without any particular care in the adjustment of the valves $C^2$, forms a basis for a sufficiently close approximation to the setting of these valves $C^2$ required to give a steam flow through the calorimeter pipes of the same velocity as the flow in the conduit A to insure practical accuracy in the final determination of the amount of steam flowing through the conduit A. A correction for the loss of heat from pipe A, due to radiation or like causes between pipes C and CC, may be made by a short run of the apparatus shown in Fig. 1 with no water in the receptacles H and H'.

The method of, and apparatus for measuring steam flow described may be used in obtaining a continuous measurement of the flow of steam through a conduit, but they are especially devised for calibrating other steam flow apparatus better adapted for regular and continuous use though inherently less accurate than the method and apparatus disclosed herein. The method and apparatus described is especially advantageous for such calibration purposes because of the comparative ease with which the apparatus may be applied to existing installations without appreciable structural changes in the apparatus already installed, and without interfering with the normal use of the steam line.

The calorimeter described, possesses substantial advantages of simplicity and accuracy resulting from the effective manner in which the inner chamber $B^2$ of each calorimeter is insulated against the modifying thermal effects of atmospheric temperature changes.

While in accordance with the provisions of the statutes, I have illustrated and described the best forms of apparatus and the best method of using the same in the practice of my invention now known to me, it will be apparent to those skilled in the art that changes may be made in the form of the apparatus and operating methods without departing from the spirit of my invention as set forth in the appended claims, and that certain features of my invention may sometimes be used to advantage without a corresponding use of other features.

Having now described my invention, what I claim as new and desire to secure by Letters Patent, is:

1. The combination with a steam conduit, of throttling calorimeters connected thereto at spaced apart points and means for subjecting the steam flowing between said points to a measured steam quality changing effect, and separate liquid and vapor containers subjected to the temperatures in the two calorimeters and a differential pressure gage for measuring the difference between the vapor pressures in said containers.

2. The combination with a steam conduit, of a throttling calorimeter having its throttling orifice connected to the conduit by a pipe which comprises an inlet portion extending into the conduit and facing the direction of flow therein, a throttling valve in the pipe, and a pressure gage connected to the pipe between said valve and the throttling orifice.

3. The method of measuring the rate of steam flow through a conduit by means of a pair of throttling calorimeters connected to the conduit at separated points along the length of the latter so as to be heated to a temperature corresponding to the quality of the steam in the conduit at the point to which each calorimeter is connected which consists in subjecting the steam flowing between said points to a measured steam quality changing effect, utilizing the temperature of each calorimeter to create a vapor pressure which is a function of that temperature and measuring the differential of the vapor pressures thus created.

4. The method of measuring the rate of steam flow through a conduit by means of a pair of throttling calorimeters connected to the conduit at separated points along the length of the latter, so as to be heated to a temperature corresponding to the quality of the steam in the conduit at the point to which each calorimeter is connected which consists in adding gas at a measured rate to the steam between said points, utilizing the temperature of each calorimeter to create a vapor pressure which is a function of that temperature, and measuring the differential of the vapor pressures thus created.

5. The method of measuring the rate of steam flow through a conduit which consists in adding a permanent gas to the steam at a measured rate, determining the change in the energy content of the steam thereby produced and determining the rate of flow from the known relationship of the gas added to the steam and the change in energy content of the steam produced by said gas addition.

WILLIAM J. CROWELL, Jr.